Patented May 25, 1926.

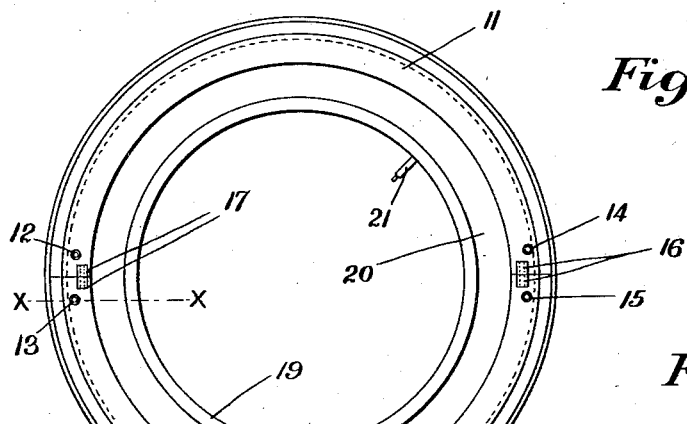
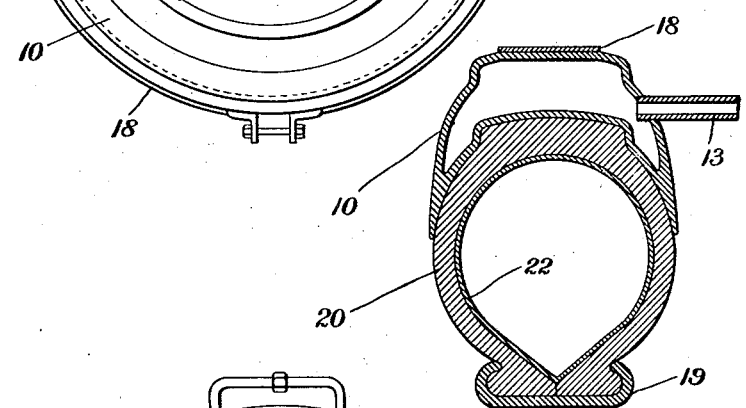
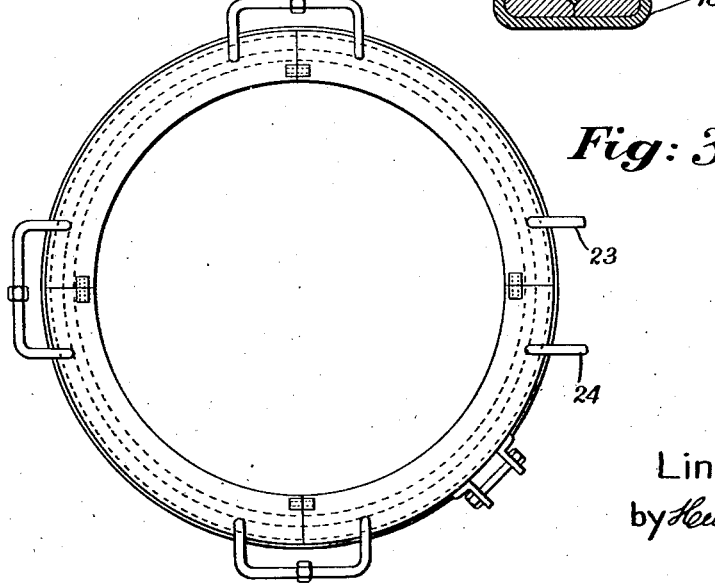

1,585,933

UNITED STATES PATENT OFFICE.

LINDSAY MILLER, OF FREMANTLE, WESTERN AUSTRALIA, AUSTRALIA.

RETREADING OF PNEUMATIC TIRES.

Application filed December 27, 1923. Serial No. 682,905.

This invention relates to improvements in retreading of pneumatic tires.

A primary object of the invention is to provide an apparatus whereby a pneumatic tire can be rapidly and efficiently retreaded by conducted heat transmitted through a plurality of jacket sections held together by a flexible tightening band.

To enable the invention to be more readily understood, reference will now be made to the accompanying drawings, in which:—

Fig. 1 is a plan of one form of my apparatus showing a tire in the cooking position.

Fig. 2 is a sectional elevation on line X—X of Fig. 1, such sectional elevation being turned at right angles.

Fig. 3 is a plan of a modified form of my apparatus; in this view the tire and appurtenant parts are not shown in position.

Considering the form of the invention illustrated in Figs. 1 and 2:—

Two steel jacket sections 10 and 11 are used, such sections, which are closed at the ends, being of a shape adapted to embrace the tread but not the side walls and bead portions of the tire. If desired, provision can be made for the insertion of a patterned matrix. Each of these jackets has two conduits connected thereto, those referenced 12 and 13 being for the admission and those referenced 14 and 15 being for the discharge of high pressure steam. So that corresponding portions of the sections 10 and 11 will correctly register, two pairs of eyelets 16 and 17 on the sections are held in juxtaposition by pins.

A tightening and supporting band 18 embraces the outside periphery of the connected sections and serves to prevent them from being forced apart. Operating in conjunction with the steel sections is a split rim 19 conveniently made a little smaller than the rim that it temporarily replaces, whilst the retreading is being effected. In the drawings, the tire being retreaded is referenced 20; its valve is indicated by the numeral 21, and the tube by the numeral 22.

A tire to be retreaded is first buffed and then has the strips of rubber dough applied in the usual way. The tube 22 is then inserted and the sections 10 and 11 fitted around the tread portion of the tire. The tightening band 18 is then fitted and the split rim 19 knocked into position. When the slack has been taken out of the tightening band 18 the tube 22 is inflated.

It will be appreciated that the portion of the tire being retreaded is firmly and resiliently held against the steel jacket sections by reason of the inflation of the tube. Steam is then blown through the connected steel sections until the tread has been adequately cooked, when the tube is deflated and the rim knocked out, thereby enabling the retreaded tire to be removed.

It must be understood that the size and curvature of the jacket sections and their number is such as to conform to the size of the tire to be retreaded. By having a relatively large number of sections the removal or insertion of a section will permit varying sizes of tires to be taken; thus in the modified apparatus shown in Fig. 3 four sections are employed. These sections, like those before described, are hollow, but of course closed at each end, and they also have provision for the admission and discharge of high pressure steam. In this case the sections are joined in series, that is to say, the inlet conduit of one section communicates with the outlet conduit of an adjacent section, so that the steam enters a conduit 23 and then progressively passes through the sections and escapes by the conduit 24. In each form of the invention the jacket sections are held together by the tightening band 18.

I claim:—

An apparatus for the retreading of pneumatic tires comprising the combination of a plurality of metal sections adapted to surround the tire, a one-piece tightening band separate from said sections and surrounding them, means to clamp the band tightly around the sections thereby to retain them in place, two pairs of eyelets and co-operating pins for retaining the sections in juxtaposition, a rim to hold the tire in position, and a tube that is maintained inflated during the cooking operation.

Dated this seventh day of November 1923.

LINDSAY MILLER.